(12) United States Patent
Blouin et al.

(10) Patent No.: US 7,853,926 B2
(45) Date of Patent: Dec. 14, 2010

(54) AUTOMATED CONTEXT-SENSITIVE OPERATING SYSTEM SWITCH

(75) Inventors: Eric E. Blouin, Ardmore, PA (US); Barry A. Kritt, Raleigh, NC (US); Douglas A. Law, Chapel Hill, NC (US); Kuldip Nanda, Apex, NC (US); Paul A. Roberts, Raleigh, NC (US); Shawn Sremaniak, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 1237 days.

(21) Appl. No.: 11/283,642

(22) Filed: Nov. 21, 2005

(65) Prior Publication Data

US 2007/0168728 A1   Jul. 19, 2007

(51) Int. Cl.
   G06F 9/44    (2006.01)
   G06F 9/46    (2006.01)
   G06F 15/177  (2006.01)
   G06F 9/00    (2006.01)

(52) U.S. Cl. ............ 717/124; 719/313; 713/2; 713/100; 709/221; 709/222; 718/108

(58) Field of Classification Search ............ None
   See application file for complete search history.

(56) References Cited

U.S. PATENT DOCUMENTS

| | | | |
|---|---|---|---|
| 4,675,814 A * | 6/1987 | Murai et al. | 717/162 |
| 4,833,594 A | 5/1989 | Familetti et al. | |
| 4,868,875 A | 9/1989 | Goatman | |
| 5,136,705 A * | 8/1992 | Stubbs et al. | 714/27 |
| 5,295,264 A | 3/1994 | Werres et al. | |
| 5,396,619 A | 3/1995 | Walton | |
| 5,483,647 A | 1/1996 | Yu et al. | |
| 5,699,502 A | 12/1997 | Swanberg et al. | |
| 5,901,289 A | 5/1999 | Leonard et al. | |
| 5,948,101 A * | 9/1999 | David et al. | 713/2 |
| 6,011,830 A * | 1/2000 | Sasin et al. | 379/10.03 |
| 6,266,407 B1 | 7/2001 | Kneipp et al. | |
| 6,285,967 B1 | 9/2001 | Rajan et al. | |
| 6,327,706 B1 | 12/2001 | Amberg et al. | |
| 6,347,398 B1 * | 2/2002 | Parthasarathy et al. | 717/178 |
| 6,349,341 B1 | 2/2002 | Likes | |

(Continued)

OTHER PUBLICATIONS

D.B. Copenhaver, et al. IBM Corporation. IBM Technical Disclosure Bulletin. "OS/2 Extended Edition Configuration" vol. 32 No. 9B Feb. 1990 (p. 446-450).

(Continued)

*Primary Examiner*—Tuan Q Dam
*Assistant Examiner*—Zheng Wei
(74) *Attorney, Agent, or Firm*—Marcia L. Doubet

(57) ABSTRACT

An automated technique for switching operating systems, responsive to current context of an executing test scenario. A test designer specifies, in a process control file, a required operating system for appropriate command blocks. A test sequencer packages the required operating system name with each command to be executed, and sends that information to a test listener on a system under test. The test listener remembers the currently-running operating system, and compares that to the required operating system for each command to be executed. If a mismatch occurs, then the correct operating system is not running, and the listener automatically triggers a reboot.

21 Claims, 7 Drawing Sheets

U.S. PATENT DOCUMENTS

| | | | |
|---|---|---|---|
| 6,351,769 B1 | 2/2002 | King et al. | |
| 6,370,641 B1 | 4/2002 | Maia | |
| 6,473,824 B1 | 10/2002 | Kreissig et al. | |
| 6,473,857 B1 | 10/2002 | Panas et al. | |
| 6,477,486 B1 | 11/2002 | Ram et al. | |
| 6,499,115 B1 | 12/2002 | Wiedeman et al. | |
| 6,522,309 B1 | 2/2003 | Weber | |
| 6,557,128 B1 | 4/2003 | Turnquist | |
| 6,560,706 B1 | 5/2003 | Carbajal et al. | |
| 6,587,960 B1* | 7/2003 | Barford et al. | 714/8 |
| 6,615,406 B1* | 9/2003 | Amberg et al. | 717/177 |
| 6,651,093 B1* | 11/2003 | Wiedeman et al. | 709/221 |
| 6,654,347 B1 | 11/2003 | Wiedeman et al. | |
| 6,691,146 B1 | 2/2004 | Armstrong et al. | |
| 6,718,373 B1* | 4/2004 | Bearden et al. | 709/220 |
| 6,721,762 B1 | 4/2004 | Levine | |
| 6,757,720 B1 | 6/2004 | Weschler, Jr. | |
| 6,807,665 B2 | 10/2004 | Evans et al. | |
| 6,816,866 B2 | 11/2004 | Weber | |
| 6,826,710 B2 | 11/2004 | Merkin et al. | |
| 6,850,254 B1 | 2/2005 | Banning et al. | |
| 6,859,925 B2 | 2/2005 | Lin | |
| 6,910,064 B1 | 6/2005 | Astarabadi et al. | |
| 6,973,564 B2 | 12/2005 | Merkin et al. | |
| 7,000,231 B1 | 2/2006 | Gold | |
| 7,039,682 B2 | 5/2006 | Baitinger et al. | |
| 7,047,403 B2 | 5/2006 | Lin | |
| 7,054,700 B2* | 5/2006 | Blouin et al. | 700/96 |
| 7,062,645 B2 | 6/2006 | Kroening | |
| 7,085,921 B2 | 8/2006 | Frye, Jr. | |
| 7,093,124 B2 | 8/2006 | Girard | |
| 7,146,350 B2* | 12/2006 | Holland et al. | 706/47 |
| 7,284,120 B2* | 10/2007 | Blouin et al. | 713/2 |
| 7,359,824 B2 | 4/2008 | Blouin et al. | |
| 7,493,226 B2* | 2/2009 | Robertson et al. | 702/106 |
| 7,519,807 B2* | 4/2009 | Paul et al. | 713/2 |
| 2001/0052030 A1 | 12/2001 | Shiraishi | |
| 2002/0162059 A1* | 10/2002 | McNeely et al. | 714/703 |
| 2002/0188514 A1 | 12/2002 | Kritt | |
| 2003/0028629 A1 | 2/2003 | Amro | |
| 2003/0046529 A1 | 3/2003 | Loison et al. | |
| 2003/0046680 A1* | 3/2003 | Gentry | 717/176 |
| 2003/0074549 A1* | 4/2003 | Paul et al. | 713/2 |
| 2003/0208712 A1 | 11/2003 | Louden et al. | |
| 2003/0234737 A1 | 12/2003 | Nelson et al. | |
| 2004/0103138 A1 | 5/2004 | Lamport et al. | |
| 2004/0153637 A1* | 8/2004 | Harper et al. | 713/1 |
| 2004/0153999 A1* | 8/2004 | Miyao et al. | 717/128 |
| 2004/0199758 A1 | 10/2004 | Meaney et al. | |
| 2005/0055688 A1 | 3/2005 | Barajas et al. | |
| 2005/0060706 A1* | 3/2005 | Doyon et al. | 718/100 |
| 2005/0066015 A1 | 3/2005 | Dandekar et al. | |
| 2005/0107902 A1 | 5/2005 | Blouin et al. | |
| 2005/0108512 A1 | 5/2005 | Blouin et al. | |
| 2005/0137819 A1* | 6/2005 | Lam et al. | 702/119 |
| 2005/0198239 A1* | 9/2005 | Hughes | 709/222 |
| 2005/0198629 A1 | 9/2005 | Vishwanath | |
| 2005/0289505 A1* | 12/2005 | Williams | 717/103 |
| 2006/0070032 A1* | 3/2006 | Bramley et al. | 717/124 |
| 2006/0265627 A1* | 11/2006 | Trump et al. | 714/30 |
| 2007/0005283 A1 | 1/2007 | Blouin et al. | |
| 2008/0140335 A1 | 6/2008 | Blouin et al. | |

OTHER PUBLICATIONS

Eric E. Blouin et al., U.S. Appl. No. 10/716,061, filed: Nov. 17, 2003, Office Action, Jul. 22, 2004, 5 pages.

Eric E. Blouin et al., U.S. Appl. No. 10/716,061, filed: Nov. 17, 2003, Office Action, Jan. 13, 2005, 6 pages.

Eric E. Blouin et al., U.S. Appl. No. 10/716,061, filed: Nov. 17, 2003, Office Action, Jun. 15, 2005, 7 pages.

Eric E. Blouin et al., U.S. Appl. No. 10/716,061, filed: Nov. 17, 2003, Notice of Allowance, Dec. 8, 2005, 6 pages.

Eric E. Blouin et al., U.S. Appl. No. 10/715,961, filed: Nov. 17, 2003, Office Action, Jun. 19, 2006, 12 pages.

Eric E. Blouin et al., U.S. Appl. No. 10/715,961, filed: Nov. 17, 2003, Office Action, Mar. 7, 2007, 9 pages.

Eric E. Blouin et al., U.S. Appl. No. 10/715,961, filed: Nov. 17, 2003, Notice of Allowance, May 9, 2007, 7 pages.

Eric E. Blouin et al., U.S. Appl. No. 10/715,961, filed: Nov. 17, 2003, Supplemental Notice of Allowance, Jul. 23, 2007, 6 pages.

Eric E. Blouin et al., U.S. Appl. No. 10/715,961, filed: Nov. 17, 2003, Petition Decision, Aug. 2, 2007, 1 page.

Eric E. Blouin et al., U.S. Appl. No. 10/715,961, filed: Nov. 17, 2003, Notice of Allowance, Aug. 21, 2007, 7 pages.

Eric E. Blouin et al., U.S. Appl. No. 11/170,961, filed: June 29, 2005, Office Action, Aug. 1, 2006, 9 pages.

Eric E. Blouin et al., U.S. Appl. No. 11/170,353, filed: June 29, 2005, Office Action, Dec. 12, 2006, 15 pages.

Eric E. Blouin et al., U.S. Appl. No. 11/170,353, filed: Jun. 29, 2005, Office Action, May 4, 2007, 13 pages.

Eric E. Blouin et al., U.S. Appl. No. 11/170,353, filed: Jun. 29, 2005, Advisory Action, Jul. 31, 2007, 3 pages.

Eric E. Blouin et al., U.S. Appl. No. 11/170,353, filed: Jun. 29, 2005, Notice of Allowance, Dec. 6, 2007, 7 pages.

Eric E. Blouin et al., U.S. Appl. No. 12/031,823, filed: Feb. 15, 2008, Office Action, Nov. 27, 2009, 5 pages.

Eric E. Blouin et al., U.S. Appl. No. 12/031,823, filed: Feb. 15, 2008, Examiner's Interview Summary, Mar. 2, 2010, 3 pages.

Eric E. Blouin et al., U.S. Appl. No. 12/031,823, filed: Feb. 15, 2008, Notice of Allowance, Mar. 19, 2010, 7 pages.

* cited by examiner

FIG. 3

```
300
<?xml version="1.0" encoding="UTF-8"?>
<BLOCK BNAME="SOLUTION" X3_XML_VERSION="0.21">                            ─ 310
    <BLOCK BNAME="TEST" OS="LINUX"> ─321                                   ─ 320
        <BLOCK BNAME="DIAGNOSTICS" OS="DOS" RUN_IF="condition_1">─331  ─332
            <SEND_CMD Q="SUT"> program_1.pyc </SEND_CMD>─335               ─ 330
            ...
            <SEND_CMD Q="SUT"> program_n.bat </SEND_CMD>─336
        </BLOCK>
        <BLOCK BNAME="FINAL_CHECK">
            <SEND_CMD Q="SUT"> program_a.exe </SEND_CMD>─345               ─ 340
            ...
            <SEND_CMD Q="SUT"> program_z.exe -- status=done </SEND_CMD>─346
        </BLOCK>
    </BLOCK>
</BLOCK>
```

```
         LABEL   1

410 LABEL   LINUX
            KERNEL linux.1
            APPEND initrd=linux.2

420 LABEL   DOS
            KERNEL memdisk
            APPEND initrd=dos.img

430 DEFAULT  LINUX
```

```
         LABEL   1

410 LABEL   LINUX
            KERNEL linux.1
            APPEND initrd=linux.2

420 LABEL   DOS
            KERNEL memdisk
            APPEND initrd=dos.img

460 DEFAULT  DOS
```

FIG. 5

```
500
    <X3MSG>
        <SEND_CMD>
501         DESC="sample test command"
502         Q="SUT"
503         ACTION_ID="00000008"
504         OS="LINUX"
505         UID="1S123456712345">
506             <![CDATA[program_a.exe]]>
        </SEND_CMD>
    </X3MSG>
```

AUTOMATED CONTEXT-SENSITIVE OPERATING SYSTEM SWITCH

RELATED APPLICATIONS

The present invention is related to the following commonly-assigned applications: application Ser. No. 10/716,061, "Method and System for Efficient Order Processing in a Manufacturing Environment" (now U.S. Pat. No. 7,054,700) and application Ser. No. 10/715,961, "Method and System for Allowing a System Under Test (SUT) to Boot a Plurality of Operating Systems Without a Need for Local Media" (now U.S. Pat. No. 7,284,120), both filed on Nov. 17, 2003, and application Ser. No. 10/170,353, "Systems and Methods for a Distributed Execution Environment with Per-Command Environment Management" (now U.S. Pat. No. 7,359,824), filed on Jun. 29, 2005.

BACKGROUND OF THE INVENTION

The present invention relates generally to computer programming, and more particularly to automated switching from one operating system to another during system testing, based on a context required for test command(s) to be executed.

As is well known, it is desirable to perform a number of tests on computer systems after manufacturing and prior to shipment of the systems to customers. The content of the tests may depend, generally, on the type of system and what types of tests are deemed useful for verifying operation of that type of system.

The term "system under test", or "SUT", is commonly used to refer to a system being tested. A system under test may be a laptop computer, personal digital assistant ("PDA"), workstation, mainframe, embedded computing device, or any other type of computer or digital processing system.

As is also well known, an operating system controls operation of a processing component of a system, and may also control a number of components peripheral to the system. Commands to be executed during system testing may require a particular operating system.

BRIEF SUMMARY OF THE INVENTION

In one aspect, the present invention provides a test system for automatically switching operating systems at a SUT. Preferably, this test system comprises: a process control file specifying a plurality of commands to be executed on the SUT and further specifying a required operating system applicable to execution of one or more of the commands, wherein at least two different required operating systems are specified as being applicable to the plurality of commands; and a test sequencer that iteratively evaluates the process control file and, responsive to the evaluation: selects a next-executable one of the commands; determines, from the specification of the required operating system, which operating system is required for the selected command; packages, in a command message, an identification of the required operating system and the selected command; communicates the identification of the required operating system to a reboot process; and forwards the packaged command message to the SUT, such that the SUT can compare the identification of the required operating system to a currently-running operating system at the SUT before executing the selected command and, if a mismatch is detected, can trigger the reboot process to reboot the SUT to the required operating system as communicated thereto. The communication may comprise, for example, writing the identification into a configuration file or other storage repository.

In another aspect, the present invention provides for testing a SUT, comprising: forwarding, from a test sequencer running on a server to a test listener running on the SUT, command messages, each command message comprising a command to be executed on the SUT and an identification of an operating system required for executing the command; and triggering, by the test listener, a reboot of a currently-running operating system of the SUT, upon detecting that the operating system identified in a next-executable forwarded command message is different from the currently-running operating system.

In a further aspect, the present invention provides a test sequencer, running on a server, for use when testing a SUT, comprising: forwarding, from the test sequencer to a test listener running on the SUT, command messages, each command message comprising a command to be executed on the SUT and an identification of an operating system required for executing the command, such that a reboot of a currently-running operating system of the SUT will be triggered, by the test listener, upon detecting that the operating system identified in a next-executable forwarded command message is different from the currently-running operating system.

In yet another aspect, the present invention provides a test listener, running on a SUT, for use when testing the SUT, comprising: triggering, by the test listener, a reboot of a currently-running operating system of the SUT, upon (1) evaluating a command message forwarded to the test listener from a test sequencer running on a server, the command message comprising a command to be executed on the SUT and an identification of an operating system required for executing the command, and (2) detecting that the operating system identified in the forwarded command message is different from the currently-running operating system.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined by the appended claims, will become apparent in the non-limiting detailed description set forth below.

The present invention will be described with reference to the following drawings, in which like reference numbers denote the same element throughout.

BRIEF DESCRIPTION OF THE SEVERAL VIEWS OF THE DRAWINGS

FIG. 3 illustrates a sample process control file, which specifies information for a hypothetical testing scenario, according to preferred embodiments;

FIGS. 4A and 4B illustrate a sample configuration file, before and after a programmatic modification thereof, and are used to describe operation of preferred embodiments;

FIG. 5 provides a sample command message, according to preferred embodiments.

DETAILED DESCRIPTION OF THE INVENTION

Figure 1:
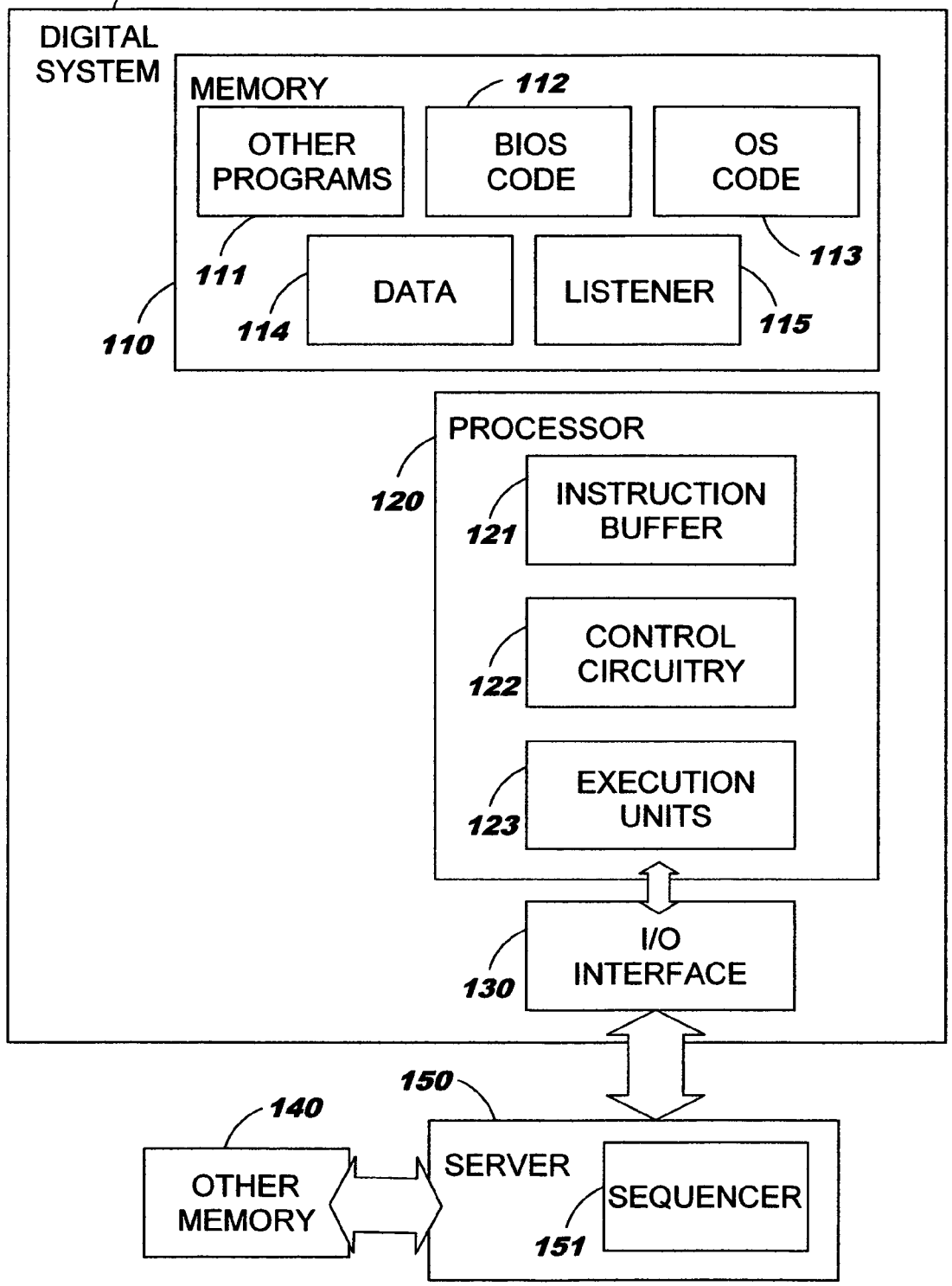
FIG. 1 illustrates a digital system such as a computer or server implemented in a network.

Preferred embodiments of the present invention are directed toward automated switching from one operating system to another during system testing, based on a context required for test command(s) to be executed. Problems of prior art system testing will now be described.

As noted earlier, commands to be executed during system testing may require a particular operating system. If the proper operating system for a particular command is not already running on the SUT, then it is necessary to switch to the proper operating system and reboot the SUT under this operating system.

A test scenario may be described, for example, using hierarchical groupings of blocks, which may include nested sub-blocks. Within these blocks and sub-blocks, commands to be executed on a SUT are specified. Conceptually, sub-blocks may be nested to an arbitrarily deep level (although in practice, restrictions may be placed on the depth of nesting).

One test framework that supports this type of hierarchical test scenario specifications is the "X3" test process framework used by various manufacturers of computing systems. The X3 framework uses a sequencer/listener architecture to execute commands on remote SUTs, under control of one or more test servers (as will be discussed in more detail, below, with reference to FIG. 2). However, other frameworks supporting a sequencer/listener architecture may be used for embodiments of the present invention without deviating from the scope of the present invention.

X3 uses a modified version of a Preboot Execution Environment ("PXE") boot loader to remotely load an operating system on one or more SUTs from a server. The boot process chooses the operating system to load on the remote SUTs based on the contents of a PXE configuration file associated with each SUT. (FIGS. 4A and 4B provide a sample configuration file, and its use with preferred embodiments will be discussed in more detail below.) Booting systems using PXE is known in the art, and a detailed discussion thereof is not deemed necessary to an understanding of the present invention; however, it is not known to enable automatic operating system switching in an X3 framework or with PXE booting, as disclosed herein.

A process control file containing hierarchical groupings of test blocks may contain multiple test paths, with conditional logic specified therein to dynamically determine which commands to execute. For example, if a particular command fails, it may be desirable to execute one next-successive command, while a different next-successive command may be desired if the particular command executes successfully. Conditional processing may also apply to entire blocks or sub-blocks within the test specification. Without the teachings disclosed herein, the test engineer is responsible for providing custom logic in the process control file to keep track of the operating system that is currently running on the SUT and, if needed for a command to be executed next, issuing commands to cause a different operating system to be booted for the SUT prior to execution of this next command. Notably, which command will execute next may be difficult to determine, in view of conditional processing considerations. Keeping track of the current operating system, and thus determining whether it is necessary to switch the operating system, may be difficult since blocks and commands may or may not execute, based on an outcome of the conditional logic. That is, a command may be encountered for which the SUT is already running the correct operating system; or, the SUT might not be running the operating system that is required. Requiring test engineers to manage the operating system explicitly in the process control file increases test process development time. In addition, the likelihood of encountering test-time errors increases, whereby an improper operating system is running on the SUT.

Because the logic for keeping track of the operating system, and switching when necessary, can be confusing and therefore error-prone, many test engineers "play it safe" and specify unconditional operating system switches and SUT reboots in the process control file. In this approach, the SUT may be rebooted prior to execution of each command. As a result, test cycle time increases and test efficiency decreases.

FIG. 1 illustrates a digital system 100 such as a computer or server implemented in a network, according to one embodiment of the present invention. Digital system 100 comprises a processor 120 that can operate according to basic input/output system ("BIOS") code 112 and operating system ("OS") code 113. The BIOS code and OS code are stored in memory 110 of the digital system 100. The BIOS code is typically stored in read-only memory ("ROM") and the OS code is typically stored on a fixed disk drive of computer system 100. Memory 110 also typically stores other programs 111 for execution by processor 120, and may also store various data 114.

Processor 120 comprises components including an instruction buffer 121, control circuitry 122, and execution units 123. Instruction buffer 121 may be provided as an instruction queue, enabling control over the order of instructions issued to the execution units 123. Execution units 123 perform the operations called for by the instructions. Control circuitry 122 is generally responsible for controlling instruction buffer 121 and execution units 123, and also typically receives feedback from execution units 123 for use in making control decisions. These components, and their operation, are well known to those of skill in the art.

Digital system 100 typically includes other components and subsystems that have not been illustrated in FIG. 1 (and which will be well known to those of skill in the art). For example, one or more network adapters are typically provided, as are controllers for a keyboard, video monitor, removable media (such as diskettes), and pointing device(s). Digital system 100 is representative of a SUT that may be tested using techniques disclosed herein, and may be (for example) a personal computer, PDA, workstation, server, mainframe computer, notebook or laptop computer, desktop computer, and so forth. Thus, the representation in FIG. 1 and its accompanying description are provided by way of illustration, but not of limitation.

FIG. 1 illustrates an input/output ("I/O") interface 130 that enables digital system 100 to communicate with other devices. For example, I/O interface 130 may comprise a network adapter, and communications may be transmitted across a network (not shown), such as a wide-area network ("WAN"), local-area network ("LAN"), the global Internet, a local intranet, an extranet, or other type of network. Network communications are well known to those of skill in the art, and a detailed description of such communications herein is therefore not deemed necessary.

During testing according to preferred embodiments, processor 120 of a SUT communicates (directly or indirectly) with a server 150, and as shown in FIG. 1, I/O interface 130 may be used for this communication. Communications between the SUT and server 150 are described in more detail, below, with reference to FIG. 2. According to preferred embodiments, server 150 directs operation of the system test at the SUT, responsive to processing of the process control file for a particular test scenario. Server 150 may access external memory 140 or storage where (for example) test-related information may be stored for retrieval by server 150. Server 150 may further comprise a number of the components which have been described with reference to digital system 100, as will be understood by those of skill in the art, although this has not been illustrated in FIG. 1.

It should also be noted that a plurality of servers may be present in a particular test environment, rather than the single server 150 which is illustrated in FIG. 1, and/or a plurality of digital systems 100 may be present Test environments involving multiple servers and/or multiple SUTs are well known to those of skill in the art.

As noted earlier, preferred embodiments use a sequencer/listener test framework. By way of illustration, digital system 100 is shown in FIG. 1 as including a test listener 115, and server 150 is shown as including a test sequencer 151. A "sequencer", as that term is used herein, refers to a component that schedules test commands to be executed by a SUT. A "listener" is a component that receives these test commands on behalf of the SUT. Preferred embodiments are discussed herein with regard to a single test sequencer on the server communicating with a single test listener on the SUT (although this is by way of illustration and not of limitation).

Alternatively, a test listener and a test sequencer may both be present on a server 150. Or, more than one test listener or test sequencer may be present. In general, a single test sequencer can communicate with multiple test listeners, and multiple test sequencers can communicate with a single test listener. These alternatives are within the scope of the present invention, and it will be obvious to one of skill in the art how the teachings disclosed herein may be adapted for such alternative environments.

Figure 2:
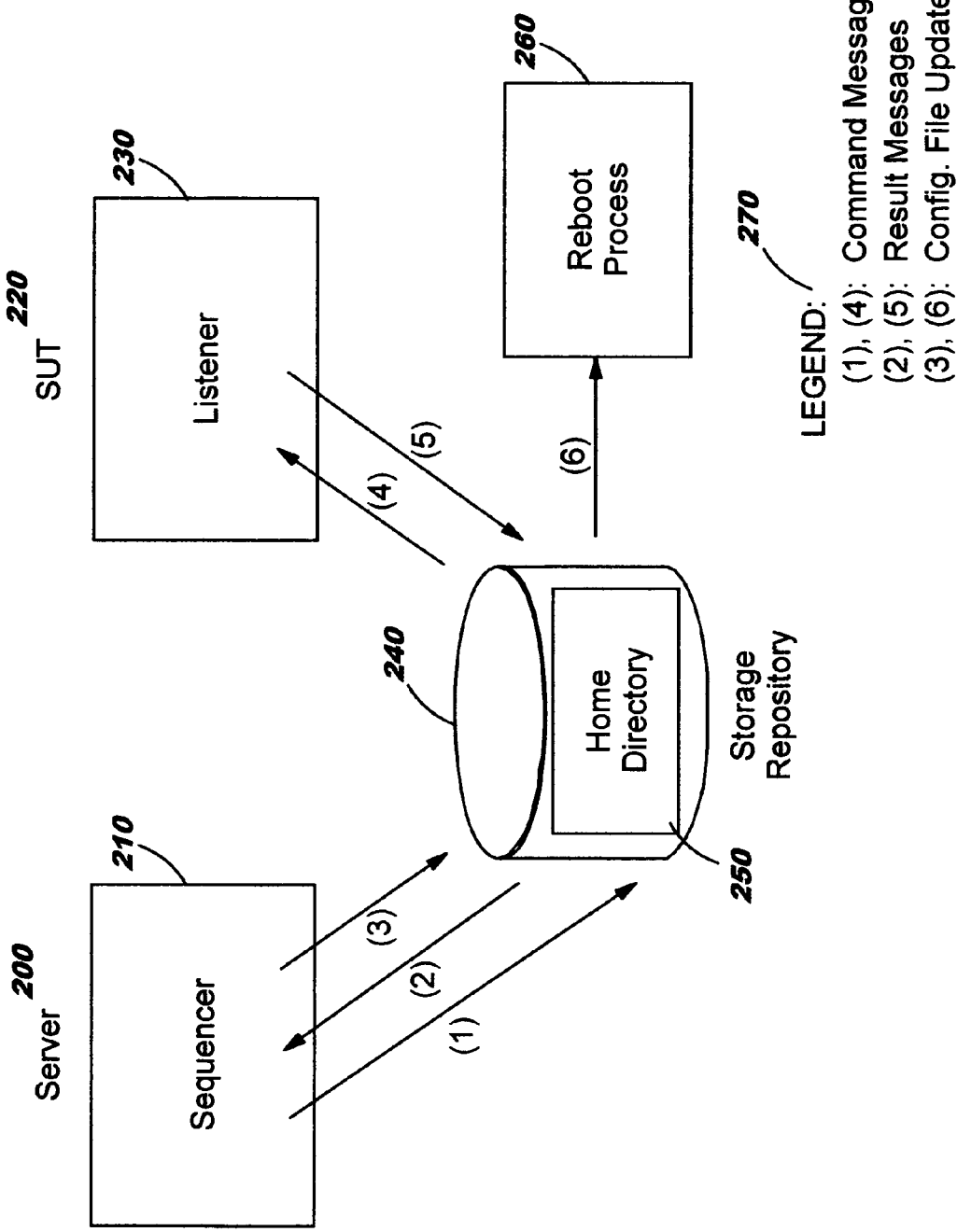
FIG. 2 illustrates several components of preferred embodiments, and interactions among them.

Referring now to FIG. 2, several components of preferred embodiments, and interactions among them, will now be described. Server 200 (corresponding generally to server 150 of FIG. 1) comprises a test sequencer 210 (corresponding generally to test sequencer 151 of FIG. 1). SUT 220 (corresponding generally to digital system 100 of FIG. 1) comprises a test listener 230 (corresponding generally to listener 115 of FIG. 1). In a preferred mode of communications between server 200 and SUT 220, an intermediary that is accessible to both server 200 and SUT 220 is used for communications therebetween. By way of illustration only, this intermediary is shown in FIG. 2 and discussed herein as comprising an external storage repository 240 such as a file system on a disk drive. As one alternative, a storage repository that is local to server 200 or SUT 220 may be used without deviating from the scope of the present invention. Or, a distinct server may be used as the intermediary between server 200 and SUT 220. Other alternatives include, but are not limited to, writing data to a database that is accessible to server 200 and SUT 220, or passing information between server 200 and SUT 220 using a message brokering system such as MQSeries® from IBM. ("MQSeries" is a registered trademark of IBM in the United States, other countries, or both.)

In a preferred embodiment, storage repository 240 comprises a "home directory" 250 for each SUT. That is, a SUT-specific directory is preferably provided, for each system to be tested, in a file system hosted by storage repository 240. This home directory 250 is accessible to the sequencer 210 and the listener 230. As noted in legend 270 of FIG. 2, the sequencer 210 preferably sends command messages (see the arrow denoted by "(1)" in FIG. 2) containing test commands to the listener 230 by writing to the SUT's home directory 250. (The sequencer may, in some embodiments, be allowed to write directly to the home directory 250. Or, the sequencer may send command messages to the storage repository 240, where the commands from those messages are then stored by the storage repository on behalf of the sequencer. These distinctions are not material to operation of the present invention.) As will be obvious to one of skill in the art, the home directory 250 need not comprise an actual "directory", particularly when an intermediary other than a file system is used. SUT-specific files may therefore be identified and organized in ways other than grouping within a directory structure, and references herein to writing/storing to a file or directory are by way of illustration but not of limitation.

Preferably, a first-in, first-out ("FIFO") queue (or an analogous data structure) is used for storing the commands in home directory 250. Sequencer 210 can therefore add commands to the home directory 250, knowing that the ordering of those commands will be preserved. As one alternative, rather than writing commands to a FIFO queue, a test sequencer may alternatively write test files to the file system of the home directory 250, without deviating from the scope of the present invention.

In preferred embodiments, each SUT 220 executes a listener 230 that retrieves commands from the home directory 250, for execution at the SUT 220 (see the arrow denoted by "(4)" in FIG. 2). When the commands are stored in a FIFO queue, this retrieval preferably comprises dequeuing a command from the head of the queue.

When a test command completes at the SUT 220, a response message comprising results of the command execution is preferably sent from the SUT to the server 200. (These results may, for example, affect subsequent execution of the test scenario by determining which branch of a conditional path will be selected by the test sequencer 210 from the process control file.)

According to preferred embodiments, the response messages are sent from listener 230 to sequencer 210 by writing a result message to the SUT's home directory 250 (see the arrow denoted by "(5)" in FIG. 2). The sequencer then retrieves those messages from the home directory (see the arrow denoted by "(2)" in FIG. 2).

The home directory for each SUT also preferably stores a configuration file for that SUT. This configuration file is used, in preferred embodiments, to inform a reboot process as to which operating system should be booted at the SUT. (FIGS. 4A and 4B provide examples of sample configuration files, as described below.) According to preferred embodiments, the sequencer 210 modifies the configuration file at the home directory when the operating system currently executing on the SUT is to be changed. The arrow denoted by "(3)" in FIG. 2 represents an update of this configuration file. When listener 230 detects that a reboot is needed (as discussed in more detail below, with reference to FIG. 6), it triggers a reboot, thereby causing a reboot process 260 to interrogate the configuration file at the home directory 250 of the triggering SUT (see the arrow denoted by ("6") in FIG. 2), and responsive to this update, the SUT will be rebooted with the operating system specified in the updated configuration file.

The manner in which a reboot occurs preferably uses prior art techniques, and therefore the actual reboot technique does not form part of the inventive teachings disclosed herein. Preferably, a PXE boot process is used and the configuration file discussed above is a PXE configuration file; accordingly, this boot process preferably comprises the listener 230 handshaking with a PXE service (e.g., signalling the reboot process 260, when needed) to boot the SUT to the operating system specified in this PXE configuration file. The PXE service may be co-located with sequencer 210 on server 200; alternatively, the PXE service may be located on a distinct server which is accessible to sequencer 210.

Turning now to FIG. 3, a sample process control file 300 is depicted. A markup language such as the Extensible Markup Language ("XML") may be used for specifying the process control file. (Note that the syntax in process control file 300 is not necessarily stored as a conventional file in a file system. Alternatives include, but are not limited to, syntax stored in a database or directory. References herein to a "file" are therefore by way of illustration but not of limitation.) In this example file 300, an outer block named "SOLUTION" (see the "BNAME", or block name", attribute of <BLOCK> element 310) comprises a single child block named "TEST" (see <BLOCK> element 320), and this child block in turn comprises two child blocks, denoted at 330 and 340, which are named "DIAGNOSTICS" and "FINAL_CHECK", respectively.

Each block in the process control file may comprise a specification of one or more commands that are to be executed at the SUT. In the sample file 300, the commands are specified using a <SEND_CMD>element. See reference numbers 335, 336, 345, and 346 in FIG. 3. The value of each <SEND_CMD> element comprises, in preferred embodiments, syntax of an executable command (which may optionally include command parameters). Refer to the related application Ser. No. 10/716,061 (now U.S. Pat. No. 7,054,700) for more details regarding syntax that may be specified as the value of a <SEND_CMD> element (further details of which are not pertinent to an understanding of the present invention).

A "Q" attribute on the <SEND_CMD> tag is used, in preferred embodiments, to identify which queue should receive this command at the home directory. In the example of FIG. 3, the value "SUT" for the "Q" attribute on each of the commands indicates that these commands are all destined for the queue associated with the SUT. Alternative techniques for identifying a target of the command may be used, such as providing a file name or Uniform Resource Locator ("URL") as the value of a command message attribute, without deviating from the scope of the present invention.

Preferred embodiments add an "OS" attribute to <BLOCK> tags for specifying which operating system is required for executing the command(s) of that block. See reference numbers 321 and 331 in FIG. 3. Specifying a different operating system in a nested block takes precedence over the operating system specified for an outer (i.e., ancestor) block. Accordingly, the sample attribute values indicate that the Linux® operating system is required for all commands in the "TEST" block 320, except for those commands within the "DIAGNOSTICS" block 330, where the DOS operating system is required. ("Linux" is a registered trademark of Linus Torvalds in the United States, other countries, or both.)

Note that the "FINAL_CHECK" block 340 does not include an "OS" attribute. This is an indication that the commands of this block are to use the same OS specified for a closest ancestor. That is, an upward traversal through the hierarchical structure is made until locating an ancestor block that specifies the "OS" attribute, and the value of that ancestor's attribute (Linux, in this example, as specified at 321) is inherited as the operating system for the "FINAL_CHECK" block 340. In the sample process control file, if the "DIAGNOSTICS" block 330 (which includes a conditional execution attribute at 332) executes, then the current operating system at the SUT will be DOS and, if the "FINAL_CHECK" block 340 is also executed, a switch of the operating system to Linux, and a reboot of the SUT, are required before executing the commands specified at 345 and 346.

Using the "OS" attribute value as disclosed herein, the test designer can easily specify the required operating system for one or more commands: writing syntax for conditional testing of the operating system, and for conditional rebooting thereof, is no longer a requirement for the test engineer.

Referring now to FIG. 4A, a sample configuration file 400 is shown, using syntax as may be required for a PXE boot service. Preferred embodiments leverage this syntax to ensure that the boot process will automatically select the proper operating system, as will now be described in more detail. (In alternative embodiments, the required operating system may be communicated in other ways.)

The "DEFAULT" element 430 is used by the PXE service to determine which operating system should be booted. Accordingly, element 430 of configuration file 400 indicates that the Linux operating system is to be booted at the SUT associated with file 400. (Details of the remaining syntax in FIG. 4A are beyond the scope of the present invention. However, by way of explanation, the "LABEL" element 410 provides information to be used when the Linux operating system is to be booted, and the "LABEL" element 420 provides information to be used when the DOS operating system is to be booted.)

Suppose that the "DIAGNOSTICS" block 330 in FIG. 3 is encountered when processing the process control file. The "OS" attribute 331 on this block indicates that the commands specified therein require the DOS operating system. According to preferred embodiments, the test sequencer therefore causes the configuration file 400 to be programmatically updated (preferably, by writing to the SUT's home directory, as discussed above with reference to FIG. 2), such that it now specifies this operating system. See configuration file 450 in FIG. 4B, which represents an updated version of configuration file 400. As shown therein, the "DEFAULT" element 460 now identifies the DOS operating system. During the SUT reboot, the reboot process will read this value and will therefore automatically boot the SUT under DOS.

In preferred embodiments, the operating system required for execution of each command at the SUT is packaged in the command message syntax which is sent from the test sequencer to the SUT's test listener. See FIG. 5 for an example message 500 where this is illustrated. In this example, a "DESC" (i.e., description) attribute 501 provides a description of the command; a "Q" attribute 502 identifies which queue should receive this command at the home directory; an "ACTION_ID" attribute 503 provides a unique command identifier that may be used for tracking command execution (e.g., to enable matching an asynchronously-arriving result message with the command message to which it corresponds); an "OS" attribute 504 specifies the operating system required for this command, as determined from the "OS" attribute values in the process control file; and a "UID" attribute 505 provides a unique identifier of a SUT's home directory. A <!CDATA> tag 506 is used to specify the command to be carried out at the SUT. (As will be obvious, alternative syntax may be used without deviating from the scope of the present invention. For example, the "DESC" attribute 501 may be omitted.)

Figure 6A:
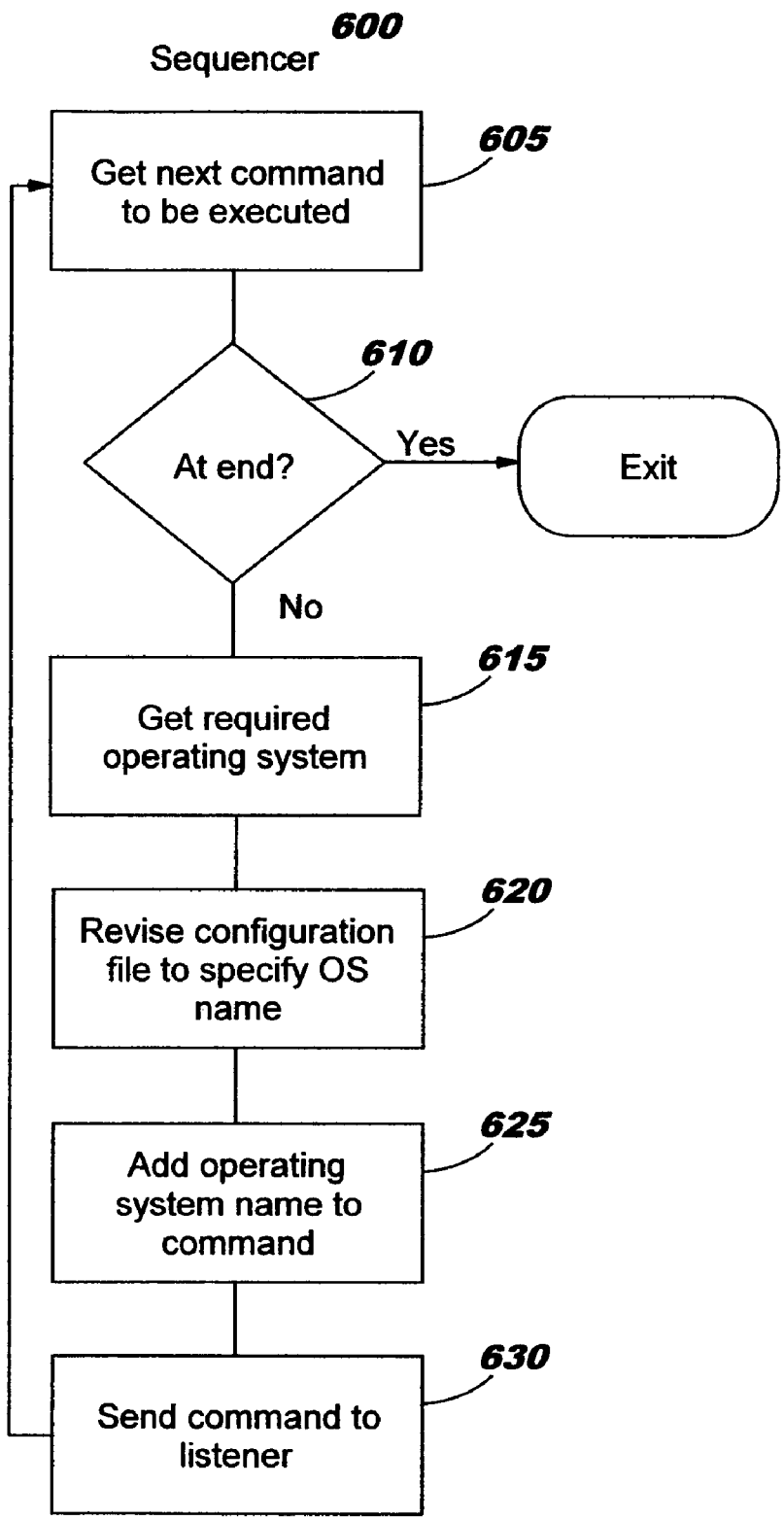
FIG. 6 (comprising FIGS. 6A and 6B) provides a flowchart depicting logic which may be used when implementing preferred embodiments.
Figure 6B:
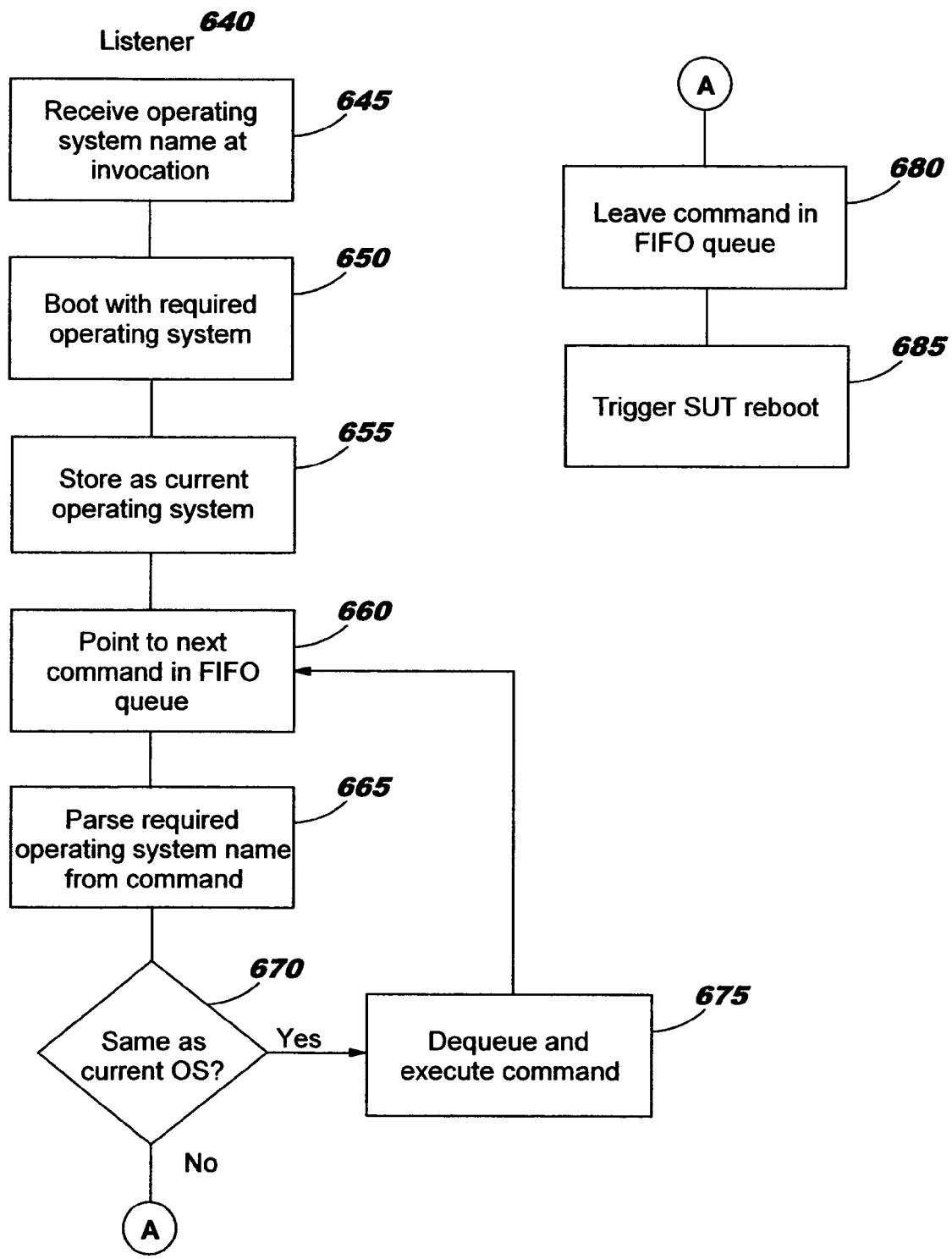

FIG. 6 (comprising FIGS. 6A and 6B) provides a flowchart depicting logic which may be used when implementing preferred embodiments. When the SUT is (re)booted, the PXE boot code passes the required operating system name to the listener program 640, according to preferred embodiments, upon invocation of the listener. The listener then awaits communications from the sequencer 600 (which corresponds generally to sequencer 151 of FIG. 1), which processes the process command file that specifies the commands for the test scenario.

Blocks 605-630 of FIG. 6A represent an iterative process whereby the sequencer parses commands from the process command file and forwards appropriate ones thereof, including a specification of the required operating system, to the listener via the listener's home directory, as will now be described in more detail.

In Block 605, the sequencer obtains the next command from the process control file. If there are no more commands, then the test in Block 610 has a positive result and the sequencer exits from the processing flow of FIG. 6. Otherwise, processing continues at Block 615, where the required operating system for this command is determined. As was discussed with reference to FIG. 3, the operating system may be specified as an attribute of the block in which the command is specified, or if not present on that block, the operating system is inherited from the attribute specified on an ancestor block. The sequencer revises the SUT's configuration file (which provides the PXE boot definition, as discussed above with reference to FIGS. 4A and 4B) at Block 620, and Block 625 adds the required operating system as an attribute of the command being packaged in a command message (as has been discussed with reference to FIG. 5). Note that the sequencer does not need to determine whether the required operating system for this command represents a change from the operating system currently executing at the SUT. Instead, according to preferred embodiments of the present invention, that determination is made by the listener at the SUT. (See the discussion of Block 670 of FIG. 6B, below.) Block 630 then sends this command to the SUT listener by sending (for example) a message to be written into the FIFO queue of the SUT's home directory. Control then returns to Block 605 to process the next command. (Note that the manner in which conditional processing syntax on commands in the process control file is evaluated, in order to select the next command to be executed during a particular test scenario, does not form part of the inventive concepts of the present invention.)

As indicated in Block 645 of FIG. 6B, the listener 640 (which corresponds generally to listener 115 of FIG. 1) receives an operating system name at invocation, and the SUT is booted with this operating system (Block 650). The name of this operating system is stored as the current operating system for the SUT (Block 655).

In Block 660, the listener points to the next command in the FIFO queue for this SUT (i.e., the command at the head of the queue). Block 665 parses this command to identify the required operating system for the command, which is specified on the queued command as the value of the "OS" attribute. Block 670 tests whether the required operating system and the current operating system are the same. If so, then at Block 675, the command is dequeued and executed. Control then returns to Block 660 to evaluate the next queued command. (References to obtaining commands from a FIFO queue are by way of illustration but not of limitation, and other techniques for obtaining the next executable command may be used without deviating from the scope of the present invention.)

When the test in Block 670 has a negative result, control reaches Block 680, which indicates that the queued command is left on the queue. (This queued command requires a different operating system than the one currently executing at the SUT, and thus it will be evaluated again once the SUT has been rebooted with the required operating system. At that subsequent evaluation, the operating system names will match, and thus the command will be dequeued and executed at Block 675.) Block 685 then triggers a reboot of the SUT. When the SUT reboots, the listener is restarted under the new operating system (see Blocks 645-650), where this new operating system is indicated in the SUT's configuration file from information written therein by the sequencer.

Some SUTs may provide multiple processors, and these multiple processors may individually support different operating systems. Accordingly, it may be desirable to have multiple operating systems executing concurrently on a particular SUT. In addition to enabling a SUT's single operating system to be automatically switched, as has been described, techniques which have been disclosed herein enable each of a plurality of operating systems executing on processors of a SUT to be booted as necessary for the testing carried out on those processors. (For example, the test sequencer may different SUTs as the target for command execution by specifying different values for attributes of the "Q" attribute 502 in command messages 500, and the operating system to be used with that particular SUT is specified using the "OS" attribute 504 as has been described.)

As will be appreciated by one of skill in the art, embodiments of the present invention may be provided as methods, systems, and/or computer program products comprising computer-readable program code. Accordingly, the present invention may take the form of an entirely software embodiment, an entirely hardware embodiment, or an embodiment combining software and hardware aspects. In a preferred embodiment, the invention is implemented in software, which includes (but is not limited to) firmware, resident software, microcode, etc.

Furthermore, embodiments of the invention may take the form of a computer program product accessible from computer-usable or computer-readable media providing program code for use by, or in connection with, a computer or any instruction execution system. For purposes of this description, a computer-usable or computer-readable medium may be any apparatus that can contain, store, communicate, propagate, or transport a program for use by, or in connection with, an instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, removable computer diskette, random access memory ("RAM"), read-only memory ("ROM"), rigid magnetic disk, and optical disk. Current examples of optical disks include compact disk with read-only memory ("CD-ROM"), compact disk with read/write ("CD-R/W"), and DVD.

While preferred embodiments of the present invention have been described, additional variations and modifications in those embodiments may occur to those skilled in the art once they learn of the basic inventive concepts. Therefore, it is intended that the appended claims shall be construed to include preferred embodiments and all such variations and modifications as fall within the spirit and scope of the invention. Furthermore, it should be understood that use of "a" or "an" in the claims is not intended to limit embodiments of the present invention to a singular one of any element thus introduced.

What is claimed is:

1. A test system for a server to cause automated switching of operating systems at a remotely-located system under test ("SUT"), comprising:
   a computer comprising a processor;

a process control file stored on a storage medium accessible to the server and specifying a plurality of commands to be executed on the SUT, wherein:
: the process control file is defined as a hierarchy of test blocks;
: the plurality of commands are organized into at least two groups, each of the groups occupying a distinct test block at a leaf level of the hierarchy;
: at least one leaf-level test block specifies a leaf-specific operating system which is required for executing the commands in the group occupying the leaf-level test block; and
: at least one leaf-level test block omits specifying an operating system which is required for executing the commands in the group occupying the leaf-level test block, while an ancestor test block specifies an ancestor-specific operating system that is different from the leaf-specific operating system; and a test sequencer that executes at the server, using the processor, to iteratively evaluate the process control file and, responsive to each evaluation:
: selects a next-executable one of the commands;
: determines, from the hierarchy of test blocks, which operating system is required for executing the selected command by determining, if the selected command is organized into one of the groups that occupies a leaf-level test block which specifies a leaf-specific operating system, that the leaf-specific operating system is required for executing the selected command and otherwise, searching each successive ancestor test block of the selected command until locating an ancestor test block which specifies an ancestor-specific operating system and then determining that the operating system required for executing the selected command is the ancestor-specific operating system;
: creates a command message that comprises an identification of the required operating system and a specification of the selected command;
: writes the identification of the required operating system in a configuration file readable by a reboot process; and
: forwards the created command message to the SUT, such that the SUT will compare the identification of the required operating system to a currently-running operating system at the SUT before executing the selected command and, if a mismatch is detected, will trigger the reboot process to reboot the SUT to the required operating system as written in the configuration file.

2. The test system according to claim 1, wherein the process control file is written in a markup language.

3. The test system according to claim 2, wherein:
: the test blocks are identified using tags of the markup language; and
: each leaf-specific operating system and each ancestor-specific operating system is specified as an attribute value for an attribute of the tag identifying the leaf-level test block and ancestor test block, respectively.

4. The test system according to claim 1, further comprising a test listener that receives the commands forwarded to the SUT, determines the required operating system for each received command by inspecting the operating system identification specified therein, compares the determined operating system to the currently-running operating system, and triggers the reboot process if the mismatch occurs.

5. The test system according to claim 4, further comprising a repository for communications between the test sequencer and the SUT and wherein the forwarded command messages are written to the repository by the test sequencer and retrieved therefrom by the test listener.

6. The test system according to claim 5, wherein the repository comprises a first-in, first-out queue into which the test sequencer writes the forwarded command messages and from which the SUT retrieves the queued command messages.

7. The test system according to claim 1, further comprising a repository for communications between the test sequencer and the SUT and wherein the forwarded command messages are written to the repository by the test sequencer for retrieval therefrom by the SUT.

8. The test system according to claim 1, wherein the forwarded messages are forwarded using a message broker.

9. The test system according to claim 1, wherein each command message further comprises:
: a specification of a storage structure on the SUT; and
: a location within the storage structure where the command message is to be stored in a first-in, first-out queue for subsequent retrieval by the SUT in preparation for executing the selected command specified in the command message.

10. The test system according to claim 1, wherein:
: the server causes automated switching of operating systems at a plurality of remotely-located SUTs;
: each created command message further comprises an identification of a particular one of the SUTs and a storage repository at the particular SUT; and
: the test sequencer forwards each created command message to the identified particular one of the SUTs to be stored in the identified storage repository for subsequent retrieval by the particular one of the SUTs in preparation for executing the selected command specified in the command message.

11. The test system according to claim 10, wherein the storage repository comprises a first-in, first-out ("FIFO") queue into which the forwarded command messages for the particular SUT are queued for the subsequent retrieval.

12. A computer-implemented method for a server to cause automated switching of operating systems at a remotely-located system under test ("SUT"), comprising:
: specifying, in a process control file stored on a storage medium accessible to the server, a plurality of commands to be executed on the SUT, wherein:
:: the process control file is defined as a hierarchy of test blocks;
:: the plurality of commands are organized into at least two groups, each of the groups occupying a distinct test block at a leaf level of the hierarchy;
:: at least one leaf-level test block specifies a leaf-specific operating system which is required for executing the commands in the group occupying the leaf-level test block; and
:: at least one leaf-level test block omits specifying an operating system which is required for executing the commands in the group occupying the leaf-level test block, while an ancestor test block specifies an ancestor-specific operating system that is different from the leaf-specific operating system; and
: iteratively evaluating the process control file by a test sequencer that executes at the server and, responsive to each evaluation:
:: selecting a next-executable one of the commands;
:: determining, from the hierarchy of test blocks, which operating system is required for executing the selected command by determining, if the selected command is organized into one of the groups that occupies a leaf-level test block which specifies a leaf-specific operating system, that the leaf-specific operating system is required for executing the selected command and otherwise, searching each successive ancestor test block of the selected command until locating an ancestor test block which specifies an ancestor-specific operating system and then determining that the operating system required for executing the selected command is the ancestor-specific operating system;

creating a command message that comprises an identification of the required operating system and a specification of the selected command;

writing the identification of the required operating system in a configuration file readable by a reboot process; and forwarding the created command message to the SUT, such that the SUT will compare the identification of the required operating system to a currently-running operating system at the SUT before executing the selected command and, if a mismatch is detected, will trigger the reboot process to reboot the SUT to the required operating system as written in the configuration file.

13. The computer-implemented method according to claim 12, wherein:

the process control file is written in a markup language;

the test blocks are identified using tags of the markup language; and each leaf-specific operating system and each ancestor-specific operating system is specified as an attribute value for an attribute of the tag identifying the leaf-level test block and ancestor test block, respectively.

14. The computer-implemented method according to claim 12, wherein each command message further comprises:

a specification of a storage structure on the SUT; and a location within the storage structure where the command message is to be stored in a first-in, first-out queue for subsequent retrieval by the SUT in preparation for executing the selected command specified in the command message.

15. The computer-implemented method according to claim 12, wherein:

the server causes automated switching of operating systems at a plurality of remotely-located SUTs;

each created command message further comprises an identification of a particular one of the SUTs and a storage repository at the particular SUT; and the test sequencer forwards each created command message to the identified particular one of the SUTs to be stored in the identified storage repository for subsequent retrieval by the particular one of the SUTs in preparation for executing the selected command specified in the command message.

16. The computer-implemented method according to claim 15, wherein the storage repository comprises a first-in, first-out ("FIFO") queue into which the forwarded command messages for the particular SUT are queued for the subsequent retrieval.

17. A computer program product for a server to cause automated switching of operating systems at a remotely-located system under test ("SUT"), the computer program product embodied on at least one computer-readable storage media and comprising computer-readable program code for:

iteratively selecting, by a test sequencer that executes at the server, a next-executable one of a plurality of commands from a process control file stored on a storage medium accessible to the server, the plurality of commands for executing on the SUT, wherein:

the process control file is defined as a hierarchy of test blocks;

the plurality of commands are organized into at least two groups, each of the groups occupying a distinct test block at a leaf level of the hierarchy;

at least one leaf-level test block specifies a leaf-specific operating system which is required for executing the commands in the group occupying the leaf-level test block; and at least one leaf-level test block omits specifying an operating system which is required for executing the commands in the group occupying the leaf-level test block, while an ancestor test block specifies an ancestor-specific operating system that is different from the leaf-specific operating system; and for each of the selected commands, performing:

determining, from the hierarchy of test blocks, which operating system is required for executing the selected command by determining, if the selected command is organized into one of the groups that occupies a leaf-level test block which specifies a leaf-specific operating system, that the leaf-specific operating system is required for executing the selected command and otherwise, searching each successive ancestor test block of the selected command until locating an ancestor test block which specifies an ancestor-specific operating system and then determining that the operating system required for executing the selected command is the ancestor-specific operating system;

creating a command message that comprises an identification of the required operating system and a specification of the selected command;

writing the identification of the required operating system in a configuration file readable by a reboot process; and forwarding the created command message to the SUT, such that the SUT will compare the identification of the required operating system to a currently-running operating system at the SUT before executing the selected command and, if a mismatch is detected, will trigger the reboot process to reboot the SUT to the required operating system as written in the configuration file.

18. The computer program product according to claim 17, wherein:

the process control file is written in a markup language;

the test blocks are identified using tags of the markup language; and each leaf-specific operating system and each ancestor-specific operating system is specified as an attribute value for an attribute of the tag identifying the leaf-level test block and ancestor test block, respectively.

19. The computer program product according to claim 17, wherein each command message further comprises:

a specification of a storage structure on the SUT; and a location within the storage structure where the command message is to be stored in a first-in, first-out queue for subsequent retrieval by the SUT in preparation for executing the selected command specified in the command message.

20. The computer program product according to claim 17, wherein:

the server causes automated switching of operating systems at a plurality of remotely-located SUTs;

each created command message further comprises an identification of a particular one of the SUTs and a storage repository at the particular SUT; and the test sequencer forwards each created command message to the identified particular one of the SUTs to be stored in the identified storage repository for subsequent retrieval by the particular one of the SUTs in preparation for executing the selected command specified in the command message.

21. The computer program product according to claim 17, wherein the storage repository comprises a first-in, first-out ("FIFO") queue into which the forwarded command messages for the particular SUT are queued for the subsequent retrieval.

\* \* \* \* \*